Feb. 13, 1962
A. M. COON
3,020,552
SUNBATHING GLASSES
Filed Nov. 30, 1959
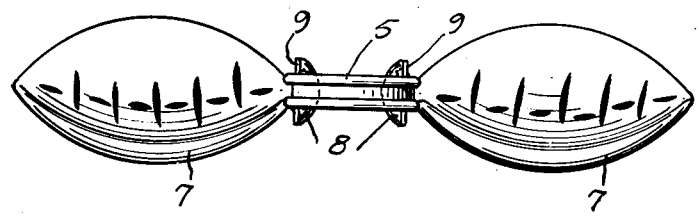
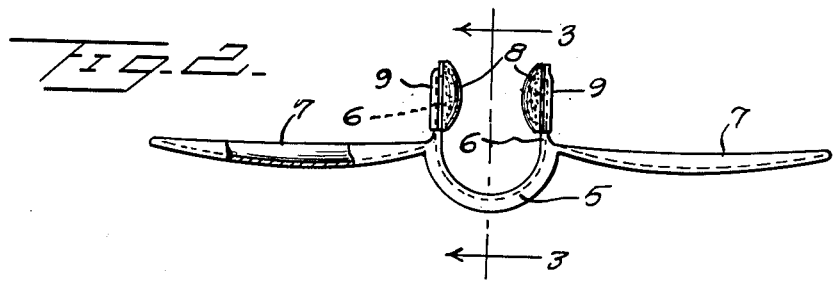
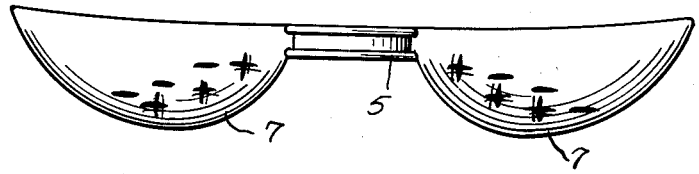
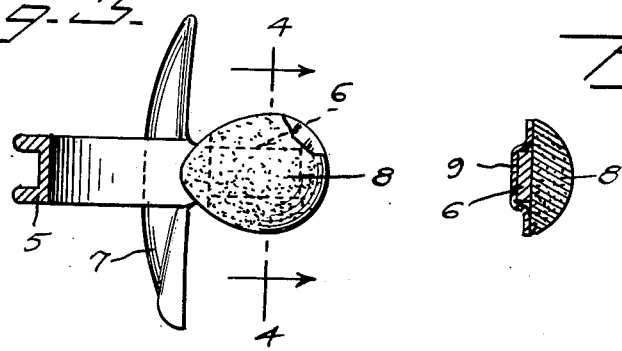
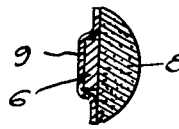
AUDREY M. COON
INVENTOR
BY *CA Snow & Geo.*
ATTORNEYS.

United States Patent Office 3,020,552
Patented Feb. 13, 1962

3,020,552
SUNBATHING GLASSES
Audrey M. Coon, P.O. Box 6232, Centre Branch, Sacramento, Calif.
Filed Nov. 30, 1959, Ser. No. 856,239
2 Claims. (Cl. 2—15)

This invention relates to eye shields designed primarily for use when sunbathing, the primary object of the invention being to provide an eye shield which will be exceptionally light in construction, and one wherein the nose piece thereof is formed as an integral part of the rimless oval shield elements of the eye shield.

An important object of the invention is to provide an eye sun shield wherein the nose piece thereof embodies a pair of parallel rearwardly extended arms which are spread apart to fit over the nose of the wearer, by the forward movement of the shield members, the nose piece automatically returning to its gripping position on the nose of the wearer when released.

Still another object of the invention is to provide an eye shield wherein the shield members may be tilted to various angular positions to properly shield the eyes against the sun rays, which would otherwise be directed to the eyes from above the upper edges of the shields.

A further object of the invention is to provide an eye shield which is constructed of semi-rigid material impervious to heat, and capable of being bent or twisted to various angular positions to facilitate the proper positioning of the eye shield, when in use.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

FIGURE 1 is a front elevation view of the eye shield, constructed in accordance with the invention.

FIGURE 2 is a plan view thereof, a portion of one of the shield units being broken away illustrating the contour of the same.

FIGURE 3 is a sectional view taken on line 3—3 of FIGURE 2.

FIGURE 4 is a sectional view taken on line 4—4 of FIGURE 3, illustrating the adhesive strip for securing the cushioning members to the nose piece.

FIGURE 5 is a front elevational view of a modified form of sun shield.

Referring to the drawing in detail, the sun bather's eye shield forming the subject matter of the present invention, is constructed preferably of one hundred percent Dupont nylon which is semi-rigid and capable of flexing to a degree for purposes to be hereinafter more fully described.

The eye shield embodies a nose piece which nose piece embodies a substantially U-shape bridge member 5 providing a pair of spaced parallel arms 6 which extend rearwardly, from the bight of the U-shaped nose piece as better shown by FIGURE 2.

The shield members which are indicated by the reference character 7, may be circular, oval or any desired configuration to meet the requirements of the individual, the eye shields being formed as an integral part of the nose piece 5 and extend from the nose piece 5 at points intermediate the ends of the arms 6, as better shown by FIGURE 2 of the drawing.

Thus it will be seen that due to this construction, by grasping the shield members 7 by the thumb and index finger at the outer ends of said shield members and bending the shield members forwardly, the arms 6 will be spread apart and readily positioned over the nose, whereupon when the shield members are released, the nose piece will assume its normal clamping position, to securing the eye shield in place.

Soft foam rubber cushioning pads 8 are secured to the inner surfaces of the members 6, as by means of adhesive strips 9, the cushioning members being rounded as shown by the drawing, so that they will fit comfortably against the sides of the nose and at the same time provide means whereby the eye shield may be adjusted to various angles with respect to the eyes of the wearer, to properly shield the eyes against the sun rays.

In view of the fact that the eye shield forming the subject matter of the present invention, is constructed of one hundred percent nylon, the shield is opaque and exceptionally light and may be worn without discomfort to the wearer.

It might be further stated that the outer surfaces of the shield members 7, are formed with certain ornamental designs or figures to lend a pleasing appearance to the eye shield.

In order that the shields may fit the contour of the face adjacent to the eyes of the wearer, the shield members 7 are of concavo-convex form, the concave surfaces fitting closely the forehead and eyebrows of the wearer to prevent injury to the eyes by the intense sun rays during sun bathing.

It will be obvious that because of the construction shown and described, the eye shield may be readily tilted to various angular positions to adjust the shield in direct rays of the sun, to shield the eyes of the wearer.

Having thus described the invention, what is claimed is:

1. A one-piece eye shield constructed of semi-rigid material, comprising a nose grip embodying a curved bridge section and a pair of spaced rearwardly extended arms formed integral with and forming continuations of said bridge section, substantially oval eye shield members formed integral with said nose piece, merging with said arms at points adjacent to said bridge section at opposite sides of said nose grip, said arms constituting nose gripping portions adapted to spread apart for positioning over the nose of the user, by a forward bending movement of said shield members, and said arms adapted to return to their normal nose gripping positions upon releasing the shields.

2. A one-piece eye shield constructed of semi-rigid plastic material embodying a substantially U-shaped nose piece, a pair of spaced parallel nose gripping arms extending rearwardly from the bight of said U-shaped nose piece, eye shield members formed integral with said nose piece, merging with said arms at points intermediate the ends of said arms, and said arms adapted to be temporarily spread apart for positioning over the nose of the wearer upon forward bending movement of said eye shield members.

References Cited in the file of this patent

UNITED STATES PATENTS

| | | |
|---|---|---|
| 207,624 | Ricketts | Sept. 3, 1878 |
| 1,401,118 | Milne | Dec. 20, 1921 |
| 2,089,233 | Welsh | Aug. 10, 1937 |
| 2,283,752 | Gonsett | May 19, 1942 |
| 2,390,523 | D'Orsay | Dec. 11, 1945 |

FOREIGN PATENTS

| | | |
|---|---|---|
| 1,017,169 | France | Sept. 10, 1952 |